No. 756,220. PATENTED APR. 5, 1904.
J. W. ELSTUN.
BELT JOINT.
APPLICATION FILED APR. 8, 1903.
NO MODEL.
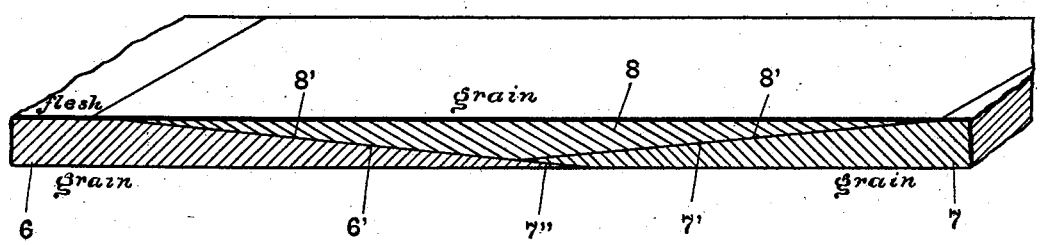
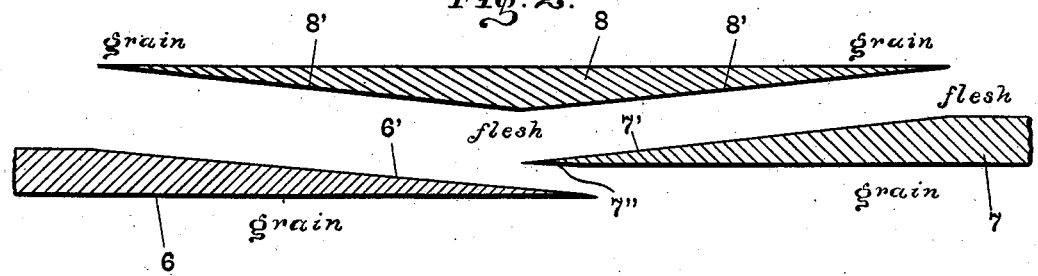
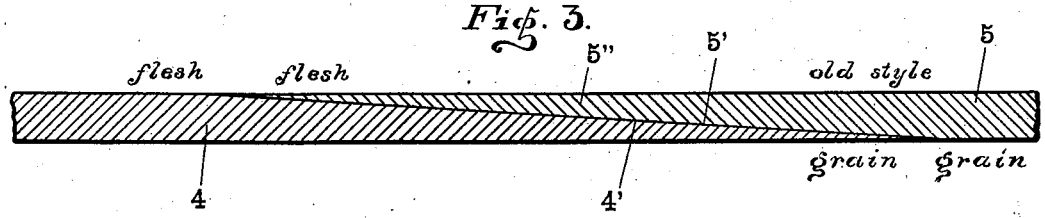
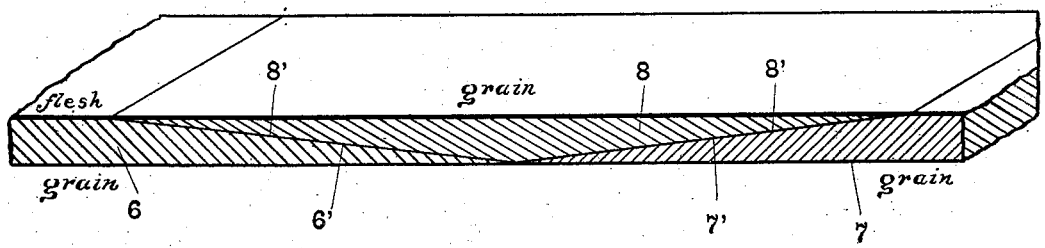
Witnesses
Adelaide Kearns
J. A. Walsh
Inventor
John W. Elstun
by Bradford & Hood
Attorneys.

No. 756,220.

Patented April 5, 1904.

UNITED STATES PATENT OFFICE.

JOHN W. ELSTUN, OF INDIANAPOLIS, INDIANA.

BELT-JOINT.

SPECIFICATION forming part of Letters Patent No. 756,220, dated April 5, 1904.

Application filed April 8, 1903. Serial No. 151,597. (No model.)

*To all whom it may concern:*

Be it known that I, JOHN W. ELSTUN, a citizen of the United States, residing at Indianapolis, in the county of Marion and State of Indiana, have invented certain new and useful Improvements in Belt-Joints, of which the following is a specification.

The object of my invention is to produce a lap-joint for leather or other material in such manner as to economize material and so as to make a stronger and more efficient joint.

The accompanying drawings illustrate my invention.

Figure 1 is a longitudinal sectional perspective of my improved joint. Fig. 2 is a section of the separate pieces of the joint, and Fig. 3 is a longitudinal section of the usual form of joint. Fig. 4 is a view of a modified form.

It has heretofore been customary in making a joint between two belts of leather or other like material for belting to take two strips 4 and 5 and bevel the end of the one from the flesh toward the grain, so as to make a surface 4', and bevel the other from the grain toward the flesh, so as to make a surface 5', and then lap the two surfaces 4' and 5' and secure them together by suitable cement. As a consequence the tip 5'' of the section 5 was composed of the flesh side of the leather and was thus materially weaker than the opposite end of the joint.

In my improved joint I have succeeded in producing a joint of such form that all of the exposed tips of the lapped portions may be made from the grain side of the leather and the construction is such that the lapping portion of the joint may be made from scrap material, so that a greater length of belt may be made from a single hide than has heretofore been possible.

In my improved joint the two portions 6 and 7 which are to be connected are beveled from the flesh side toward the grain side, so as to form surfaces 6' and 7', respectively, and the tip of one of the sections—as, for instance, the section 7—is beveled for a short distance from the grain side toward the flesh side, so as to form a short surface 7'', adapted to lie upon the tip of the surface 6', as clearly shown in Fig. 1. I then take a piece of scrap 8 and, beginning at the middle of the flesh side, bevel in opposite directions toward the grain side to form two surfaces 8' 8', adapted to lie upon the surfaces 6' and 7'. Surface 7'' is then laid upon the tip of surface 6' and the two surfaces 8' laid upon the surfaces 6' and 7', suitable cement being placed between the joining surfaces and the parts secured together by suitable pressure. When the joint is completed, each of the tips which is exposed is a tip formed from the grain side of the leather, and therefore of maximum strength and quality and less likely to break loose.

It will be readily understood that the surface 7'' need not necessarily be formed, but the tips of the two sections 6 and 7 be brought together at the crown between the two surfaces 8', if desired; but I consider the form shown in Fig. 1 as the better.

The joint described may be used for connecting any flexible materials, but is probably of greater value in connecting materials such as leather where there is a difference in the quality of the two faces.

I claim as my invention—

1. A joint for leather consisting of two pieces beveled in opposite directions, and a separate lapping-piece beveled from its middle in opposite directions and attached to the bevel-surfaces of the overlapping pieces.

2. A joint consisting of a piece 6 having a beveled face 6', a piece 7 having a bevel-surface 7' and an oppositely-beveled surface 7'', and a connecting lap-piece 8 having oppositely-beveled surfaces 8', 8'.

3. A joint for leather consisting of a piece 6 beveled from flesh to grain to form a surface 6', a second piece 7 beveled in the opposite direction from flesh to grain, and a lap-piece beveled from a medial line in opposite directions from flesh to grain, and attached to the beveled faces of the pieces 6 and 7.

4. A joint for leather consisting of a piece 6 having a beveled face 6' from flesh to grain; a piece 7 having a beveled face 7' from flesh to grain and a second beveled face 7'' from grain to flesh; and a lap-piece 8 beveled from a medial line in opposite directions from flesh to grain.

5. A joint for leather consisting of two pieces beveled in opposite directions, and a separate lapping-piece beveled from its middle in opposite directions from flesh to grain, and attached to the beveled surfaces of the said two pieces.

In witness whereof I have hereunto set my hand and seal, at Indianapolis, Indiana, this 3d day of April, A. D. 1903.

JOHN W. ELSTUN. [L. S.]

Witnesses:
ARTHUR M. HOOD,
JAMES A. WALSH.